(12) United States Patent
Takahashi et al.

(10) Patent No.: US 6,561,163 B1
(45) Date of Patent: May 13, 2003

(54) KNOCK CONTROL SYSTEM FOR AN INTERNAL COMBUSTION ENGINE

(75) Inventors: Yasuhiro Takahashi, Tokyo (JP); Toshio Uchida, Hyogo (JP); Koichi Okamura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/222,806

(22) Filed: Aug. 19, 2002

(30) Foreign Application Priority Data

May 17, 2002 (JP) ........................................ 2002-142899

(51) Int. Cl.[7] .................................................. F02P 5/00
(52) U.S. Cl. ............................... 123/406.21; 123/406.29
(58) Field of Search ..................... 123/406.21, 406.22, 123/406.2, 406.19, 406.12, 406.11, 406.29

(56) References Cited

U.S. PATENT DOCUMENTS 5,694,900 A  12/1997  Morita et al.
6,196,054 B1 * 3/2001 Okamura et al. .......... 73/35.08
6,427,662 B2 * 8/2002 Tanaya et al. .......... 123/406.29

* cited by examiner

*Primary Examiner*—Bibhu Mohanty
(74) *Attorney, Agent, or Firm*—Sughrue Mion, PLLC

(57) ABSTRACT

To provide a knock control system for an internal combustion engine, with which appropriate ignition timing control for each cylinder can be made. The knock control system includes knock detectors outputting a knock detection signal; a unit setting a threshold value for a knock judgement performed on the knock detection signal; a unit performing a knock judgement based on the threshold value and the knock detection signal; a unit setting a control parameter correction request amount at least including ignition timing, based on the knock judgement result; a unit correcting the control parameter by setting a control parameter correction amount based on a control parameter correction request amount; and a variation correction unit performing a correction to reduce variation in a cylinder when at the knock detection result and the control parameter correction amount from at least one cylinder varies greatly with respect to other cylinders.

5 Claims, 5 Drawing Sheets

FIG. 4

| KPLS | Rtable |
|---|---|
| 0 | 0.0 |
| 3 | 0.4 |
| 6 | 0.8 |
| 9 | 1.2 |
| 12 | 1.6 |
| 15 | 2.0 |
| 18 | 2.4 |
| 21 | 2.8 |
| 24 | 3.2 |

FIG. 5

| DiffR | Coef |
|---|---|
| 8 | 1.8 |
| 6 | 1.6 |
| 4 | 1.4 |
| 2 | 1.2 |
| 1 | 1.0 |
| 0 | 1.0 |
| -1 | 1.0 |
| -2 | 0.8 |
| -4 | 0.6 |
| -6 | 0.4 |
| -8 | 0.2 |

KNOCK CONTROL SYSTEM FOR AN INTERNAL COMBUSTION ENGINE

BACKGROUND OF THE INVENTION

1. Field of the Invention

The present invention relates to a knock control system for an internal combustion engine, and more particularly to a knock control system for an internal combustion engine, in which an amount of ions produced by combustion in the internal combustion engine is detected, to thereby detect an occurrence of knocking in the internal combustion engine, and correct a combustion parameter of the internal combustion engine so that the knocking is suppressed.

2. Description of the Related Art

Generally, in an internal combustion engine, air and fuel (an air-fuel mixture) introduced into a combustion chamber in each cylinder is compressed by an upward movement of a piston, and in an explosion stroke, a high voltage is applied to a spark plug in the combustion chamber to burn the compressed air-fuel mixture with electrical sparks generated at the spark plug. Explosion energy produced at this time is taken out as a downward force of the piston, and is converted into a rotational output.

In the above-mentioned explosion stroke, when the combustion occurs inside the combustion chamber, molecules inside the combustion chamber dissociate (ionize). Therefore, immediately after the explosion stroke, if a high voltage is applied to an electrode for detecting an ionic current, which is arranged inside the combustion chamber, the charged ions are allowed to flow as the ionic currents.

Besides, it is known that the ionic current varies sensitively based on a combustion state in the combustion chamber. Therefore, the combustion state (occurrence of misfire or knocking) inside the cylinders can be distinguished by detecting the states of the ionic currents.

Therefore, in the conventional art, there has been proposed a system for detecting an occurrence of knocking in the internal combustion engine by detecting the state of the ionic current, such as described in, for example, Japanese Patent Application Laid-open No. Hei 10-9108. In the knock control system for an internal combustion engine described in Japanese Patent Application Laid-open No. Hei 10-9108, a frequency band corresponding to the knocking is extracted from the ionic current by means of a band-pass filter, to serve as a knock signal. A number of knock pulses obtained by comparing the knock signal with a predetermined level is then used to determine the occurrence of knock.

In a case where a noise, which has a frequency close to that of the knock and is capable of passing through the band-pass filter, is generated in the ionic current, a pulse that corresponds to the noise is generated. However, taking this phenomenon into consideration, the detected number of pulse is subjected to averaging, and a result obtained by subtracting the average number of pulses from the number of knock pulses is assumed as the number of pulses which actually corresponds to actual knocks. Then, an amount of retardation control is increased by an amount corresponding to the number of pulse.

Incidentally, when the knock detection is performed based on the ionic current, typically there is little difference in the knock detection sensitivity levels among the cylinders. Thus, proposals have been made of an ignition timing control for each cylinder, such as in the conventional devices described in the above-mentioned publications. However, there occurs a case in which differences in the noise levels among the cylinders are generated by differences among the cylinders caused by soiling of the spark plug, wearing of the spark plug electrode, and the like. This may cause over knock judgement intense or non-detection of the knock to occur at only one cylinder.

The above-mentioned conventional devices propose a measure of calculating a knock judgement threshold value for each cylinder. However, it is confirmed through experiments that there are cases where this countermeasure alone is insufficient. One reason for this resides in that even if a knock intensity judgement method, in which the judgement is made based on the ionic currents (i.e., the number of pulses obtained by comparing the signals that have passed through the band-pulse filter with the predetermined level, according to the conventional devices), is employed, occurring of the soiling of the spark plugs, wear of the spark plug electrodes, or the like does not stabilize the noise levels, which makes it difficult to learn the noise levels perfectly.

SUMMARY OF THE INVENTION

The present invention has been made to solve the above-mentioned problems with the conventional art, and therefore has as an object to provide a knock control system for an internal combustion engine, with which appropriate ignition timing control for each cylinder can be made, even in a case where differences in noise levels of knock detection signals generated from ionic currents, are generated for each cylinder, thereby being difficult to prevent erroneous detection by simply learning the noise levels.

According to the present invention, a knock control system for an internal combustion engine includes: knock detection means for evaluating an ionic current generated at a time of combustion of an air-fuel mixture in an internal combustion engine to output a knock detection signal; threshold value setting means for setting a threshold value for use in a knock judgement performed on the knock detection signal; and knock judgement means for performing the knock judgement based on the threshold value and on the knock detection signal. Also, the knock control system for an internal combustion engine includes: control parameter correction request amount setting means for setting a control parameter correction request amount that includes at least ignition timing, based on the knock judgement result; control parameter correction means for setting the control parameter correction amount based on the control parameter correction request amount to correct the control parameter; and variation correction means for performing a correction to reduce variation exhibited by a cylinder in a case where at least one of the knock detection result and the control parameter correction amount exhibits great variation with respect to those of other cylinders.

BRIEF DESCRIPTION OF THE DRAWINGS

In the accompanying drawings:

FIG. 4 is a diagram showing a conversion table between a knock detection pulse and a retardation control basic increase amount, according to the knock control system for an internal combustion engine in accordance with Embodiment 1 of the present invention;

FIG. 5 is a diagram showing a DiffR-Coef table in the knock control system for an internal combustion engine according to Embodiment 1 of the present invention.

DETAILED DESCRIPTION OF THE PREFERRED EMBODIMENTS

Hereinafter, description will be made of embodiments of the present invention with reference to drawings.

Embodiment 1

Figure 1:
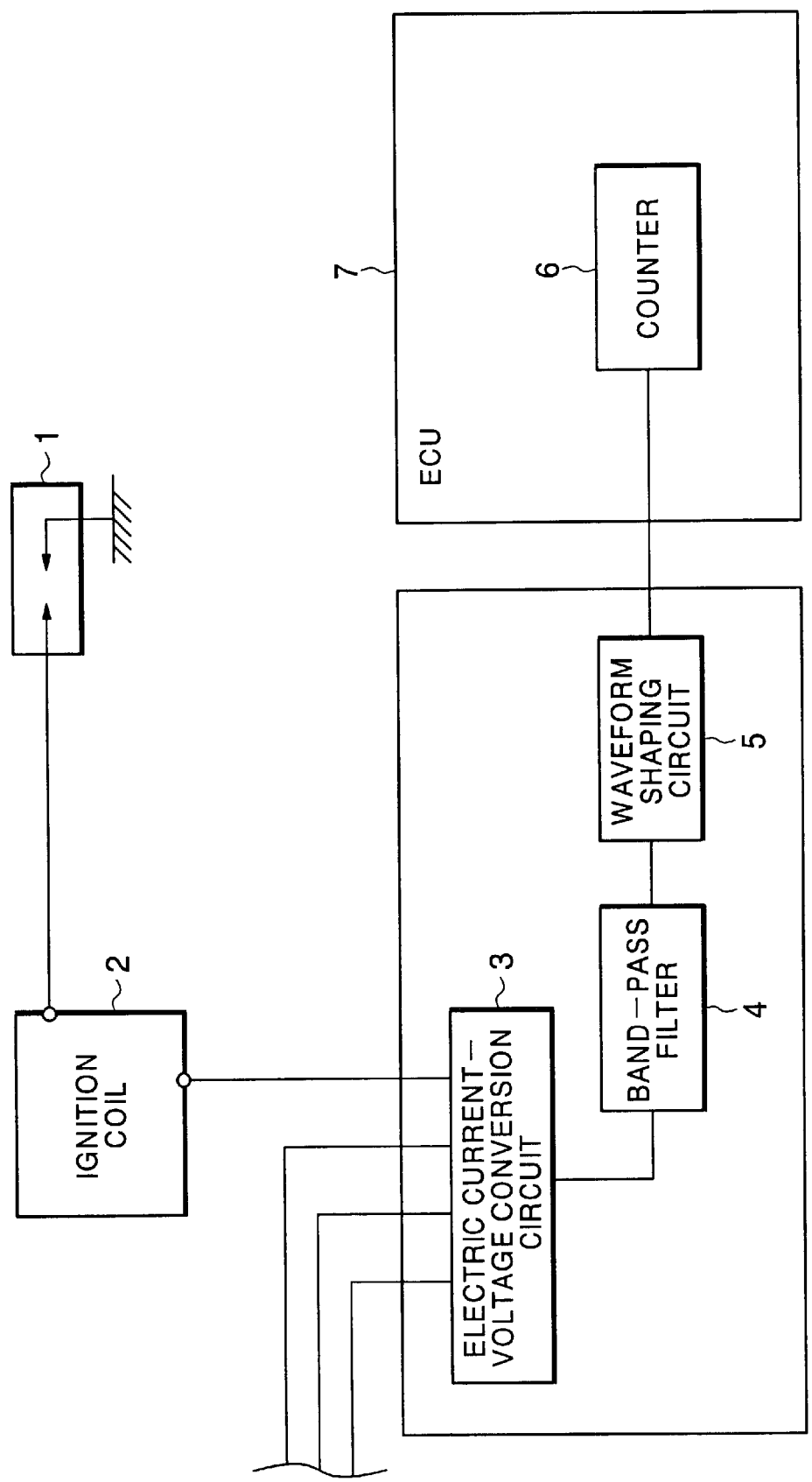
FIG. 1 is a system block diagram showing a knock control system for an internal combustion engine according to Embodiment 1 of the present invention.

FIG. 1 is a system block diagram showing a knock control system for an internal combustion engine according to Embodiment 1 of the present invention. In this case, as an example, the system that is applied to a four-cylinder engine is shown.

In FIG. 1, reference numeral 1 denotes a spark plug, and reference numeral 2 denotes an ignition coil, which is connected to the spark plug 1 and includes a bias power supply for detecting an ionic current. Reference numeral 3 denotes an electric current-voltage conversion circuit, which is connected to the ignition coil 2 and generates an ionic current signal, and reference numeral 4 denotes a band-pass filter, which is connected to the electric current-voltage conversion circuit 3 and generates a knock signal. Reference numeral 5 denotes a waveform shaping circuit, which is connected to the band-pass filter 4 and compares the knock signal from the band-pass filter 4 with a given level to produce a knock pulse. Reference numeral 6 denotes a counter, which is connected to the waveform shaping circuit 5 and counts a number of knock pulses for each ignition cycle. Reference numeral 7 denotes an ECU (engine control unit) having an arithmetic device, a counter 6, etc., the arithmetic device including control parameter correction means for correcting a control parameter by setting a control parameter correction amount (a retardation amount for each cylinder) based on at least a control parameter correction request amount (not shown). Note that the electric current-voltage conversion circuit 3, the band-pass filter 4 and the waveform shaping circuit 5 substantially constitute knock detection means for evaluating the ionic current, which is generated at the time of combustion of the air-fuel mixture in the internal combustion engine, and for outputting the knock detection signal.

Next, description will be made of a basic operation shown in FIG. 1.

At the ignition coil 2, electric current flowing a primary winding is disconnected by an ignition signal (not shown) which is supplied from the ECU 7, and a high voltage is generated at one end of a secondary winding at the time of the interruption of the primary current. This high voltage is applied to the spark plug 1, so that an air-fuel mixture (not shown) in the combustion chamber is ignited. At this time, application of power supply voltage by the ionic current bias power supply allows an ionic current to flow via ions serving as medium generated by the fuel combustion in the combustion chamber.

The ignition coil 2 supplies the detected ionic current to the electric current-voltage conversion circuit 3. Although not shown here, from the ignition coils corresponding to the other cylinders, detected ionic currents are supplied to the electric current-voltage conversion circuit 3 as well. An ionic current signal is generated by the electric current-voltage conversion circuit 3 and is inputted into the band-pass filter 4. Then, the band-pass filter 4 generates a knock signal having a frequency band corresponding to a knock.

The waveform shaping circuit 5 compares the knock signal from the band-pass filter 4 with a given level to generate a knock pulse, and the knock pulse thus generated is inputted into the ECU 7. The counter 6 inside the ECU 7 counts the number of knock pulses for each ignition cycle, and inputs the number into the arithmetic device of the ECU 7 (not shown).

Note that, the configuration shown in FIG. 1 is an example and not limited to this configuration. Configurations other than this may be used. For example, in FIG. 1, the knock signal is compared with the given level to generate the knock pulse, and the number of knock pulses is used as information indicating knocking. However, an integral value of the number of knock signals for each ignition and a peak value thereof may also be used as the information indicating knocking. The following may be adopted, in which the ionic current signal or the knock signal is A/D converted and is inputted into the arithmetic device at given periodic cycles to use the results of an FFT arithmetic operation as the information representing the knocking.

Figure 2:
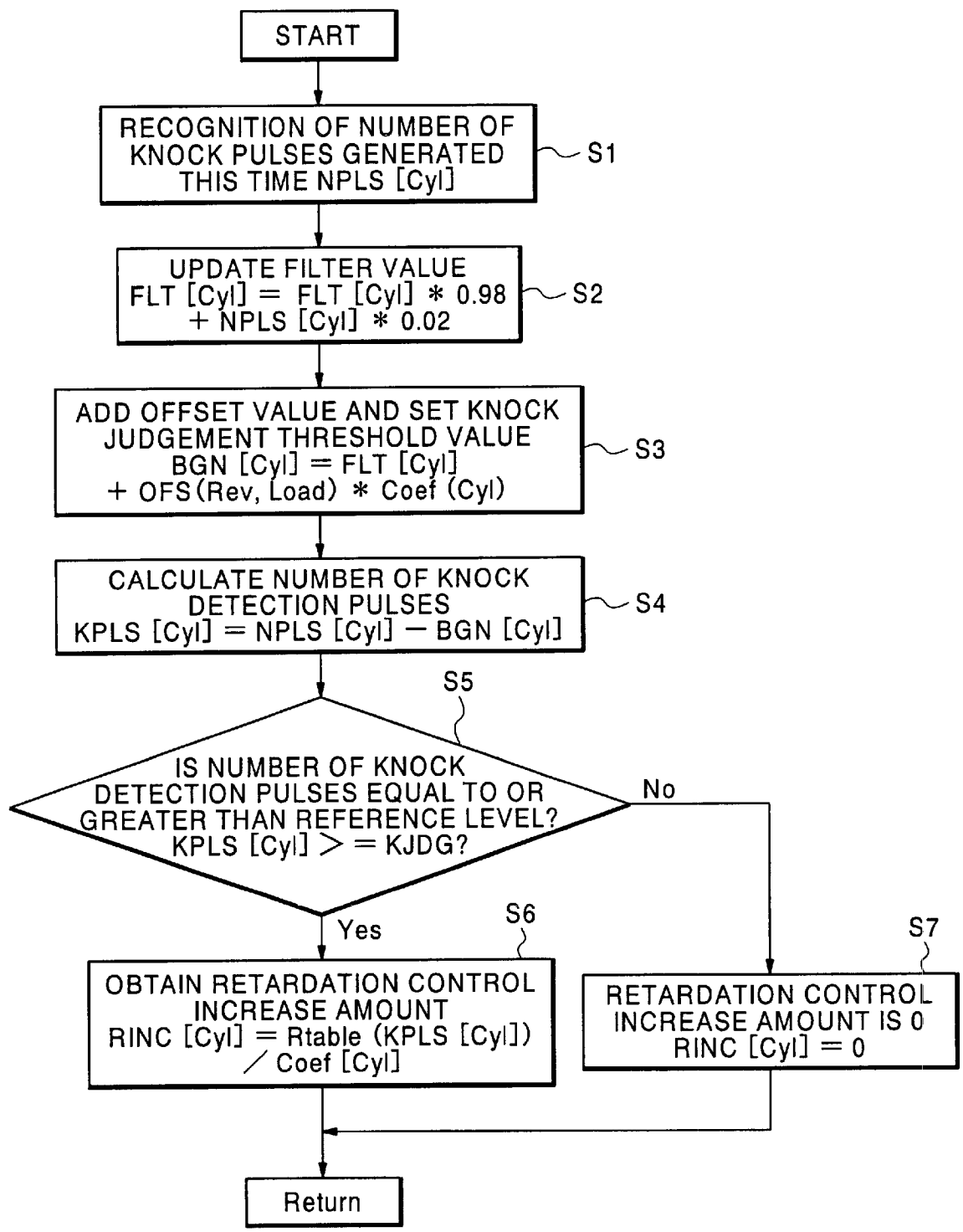
FIG. 2 is a flow chart showing a knock judgement method in the knock control system for an internal combustion engine according to Embodiment 1 of the present invention.

FIG. 2 is a flow chart showing a knock judgement method in the knock control system for an internal combustion engine according to Embodiment 1 of the present invention Next, by referring to FIG. 2, description will be made of the knock judgement method in accordance with the present embodiment of the present invention.

First, the number of knock pulses generated in this time is recognized as NPLS [Cyl: cylinder] at step S1. At step S2, the inputted number of pulses of this time is used to update a filter value FLT [Cyl], which becomes a part of a knock judgement threshold value. Here, the threshold value is a sum of 98% of the previous filter value of the cylinder in question, plus 2% of the current inputted number of pulses. However, another filter calculation method may also be used. Besides, a process may also be performed, in which the filter is not updated when it is determined that knocking has occurred.

At step S3, an offset value OFS (Rev: Load) is added to the filter value FLT [Cyl] to generate a knock judgement threshold value BGN [Cyl]. The offset value OFS (Rev: Load) is obtained from maps populated at least per engine R.P.M. Rev and load Load, and then multiplied by a correction coefficient Coef [Cyl]. Description of the correction coefficient Coef [Cyl] will be made later. Note that step S3 substantially constitutes threshold value setting means for setting the threshold value used in the knock judgement based on the level of the knock detection signal, and constitutes threshold value adjusting means for adjusting the threshold value used for the knock judgement.

At step S4 (the knock judgement means), the knock judgement threshold value BGN [Cyl] is subtracted from the current inputted number of pulses NPLS [Cyl], to thereby obtain a number of knock detection pulses KPLS [Cyl] which is the number of pulses corresponding to actual knocks.

At step S5, the number of knock detection pulses KPLS [Cyl] obtained at step S4 is compared with a knock judgment reference level KJDG, and if the number of knock detection pulses KPLS [Cyl] is below the knock judgment reference level KJDG, it is determined that knocking has not occurred, and at step S7 a retardation control increase amount RINC is set as 0.

If the number of knock detection pulses KPLS [Cyl] obtained at step S4 is equal to or greater than the knock judgment reference level KJDG, it is determined that knocking has occurred, and the retardation control increase amount RINC [Cyl] is obtained at step S6. The retardation control increase amount RINC [Cyl] is obtained by dividing a correction coefficient Coef [Cyl] into a retardation control basic increase amount Rtable [Cyl] which is obtained from a conversion table between the knock detection pulse and a retardation control basic increase amount, shown in FIG. 4. Description of the correction coefficient Coef [Cyl] will be made later. Note that FIG. 4 shows one example of the conversion table between the knock detection pulse and the retardation control basic increase amount, but it is obvious that the table is configured such that the greater the number of the knock detection pulses, the greater the retardation control basic increase amount.

Note that steps S5–S7 substantially constitute control parameter correction request amount setting means for setting the control parameter correction request amount (the retardation control increase amount), including at least ignition timing, based on the knock judgement result. Further, step S6 substantially constitutes control parameter correction request amount adjusting means for adjusting the control parameter correction request amount. Note that, in FIG. 2, a case is shown in which step 3 as the threshold value adjusting means and step S6 as the control parameter correction request amount adjusting means are simultaneously used together. However, it is also possible to substantially use either one of them. For example, in a case where step 3 is solely used, the division performed at step S6 may be omitted, and in the case where step S6 is solely used, the multiplication performed at step S3 may be omitted.

Although not shown, the aforementioned calculations are performed for each ignition cycle to obtain the retardation control increase amounts RINC [Cyl]. Those results are accumulated for each cylinder to obtain a retardation control amount, which is ultimately reflected on the ignition timing. Further, a periodic retardation control amount reduction control or the like may be performed as well. In this case, only the ignition timing is made the target of control used to perform the knock control. However, the air-fuel ratio of the air-fuel mixture may be controlled as well.

Next, description will be made of a method for setting the correction coefficient Coef [Cyl] by referring to FIG. 3.

First, at step S11, an average AveR of the ultimate retardation control amounts of all the cylinders is calculated. That is, the average value of the retardation amounts (the average value of the control parameter correction amounts) from all the cylinders is updated. Here, SumR means a sum of the ultimate retardation control amounts of all the cylinders, and N_Cyl is the number of cylinders in the internal combustion engine. Note that, instead of using the average value of the control parameter correction amounts of all the cylinders, it is also possible to use an average value of the frequency (number of times) that the occurrence of knocking is determined at all the cylinders, or both of those may be used.

In step 12, a difference DiffR [Cyl] between the average AveR of the ultimate retardation control amounts of all the cylinders which was obtained at step S11 and the ultimate retardation control amount R [Cyl] of each cylinder is obtained with respect to each cylinder. That is, the difference between the retardation amount of each cylinder and the average value of the retardation amounts of normal cylinders is updated with respect to each cylinder.

At step S13, based on the difference DiffR [Cyl] between the average AveR of the ultimate retardation control amounts of all the cylinders, which was obtained in step S12, and the ultimate retardation control amount R [Cyl] of each cylinder, the correction coefficient Coef [Cyl ] is obtained for each cylinder from a DiffR-Coef table shown in FIG. 5. Note that steps S11–S13 substantially constitute variation correction means for performing a correction to reduce variation exhibited by a cylinder when at least one of the control parameter correction amounts, which are the retardation amounts of the respective cylinders, shows great variation with respect to the other cylinders.

Next, description will be made of a method of setting the DiffR-Coef table shown in FIG. 5.

For example, the ultimate retardation control amount for a given cylinder is assumed to be currently 4° CA (i.e., crank angle) wider than the average of all the cylinders. In this case, DiffR=4 is established, and Coef=1.4 is obtained for that cylinder. Here, by referring FIG. 2, again, in step S3, the correction coefficient Coef is multiplied by the offset value OFS, and the offset value OFS is increased to 1.4 its normal value. Therefore, the knock judgement threshold value BGN increases by an amount that the offset value OFS is increased, resulting in being difficult to judge the knocking.

Besides, at step S6, the retardation control increase amount RINC is an amount obtained by dividing the correction coefficient Coef into the retardation control basic increase amount Rtable, obtained from the conversion table between the knock detection pulse and the retardation control basic increase amount, shown in FIG. 4. In a case where Coef=1.4 is established, the retardation control increase amount RINC is reduced and corrected into 1/1.4 of the Rtable value.

As described above, in the case where the ultimate retardation control amount of the given cylinder is currently greater than an average of all the cylinders, the knock judgement threshold value BGN is increased and corrected, and the retardation control increase amount is reduced and corrected. As a result, the knock judgement becomes less likely, and even if the knocking is determined, the reduction of the retardation control increase amount inhibits an increase of the retardation control amounts of the cylinders with large ultimate retardation control amounts.

Note that, by referring FIG. 5, again, when the DiffR falls within a range of from 1° CA to −1° CA, Coef=1 is established, and no correction is performed therefor. As such, setting may be performed to create a normal difference of the retardation control amount request values of the respective cylinders of the internal combustion engine as may be expected normally.

Further, in FIG. 5, in the case where the DiffR is a negative value, the Coef is 1.0 or less. However, this is a case that is opposite to the case described above where the DiffR is a positive value. Therefore, when the current ultimate retardation control amount is less than the average of all the cylinders, the knock judgement threshold value BGN is reduced and corrected, and the retardation control increase amount is increased and corrected. As a result, the knock judgement is easily performed, and if the knocking is determined, the retardation control increase amount is increased so that the retardation control amounts of the cylinders with small ultimate retardation control amounts increase more easily.

In this case, the DiffR-Coef table is set commonly for the OFS and for the Rtable. However, those may be set separately. Note that the arithmetic operations of the knock judgement must be performed for every ignition, but the arithmetic calculation of the Coef does not need to be performed for each ignition, but may be performed at predetermined time intervals.

Embodiment 2

Figure 6:
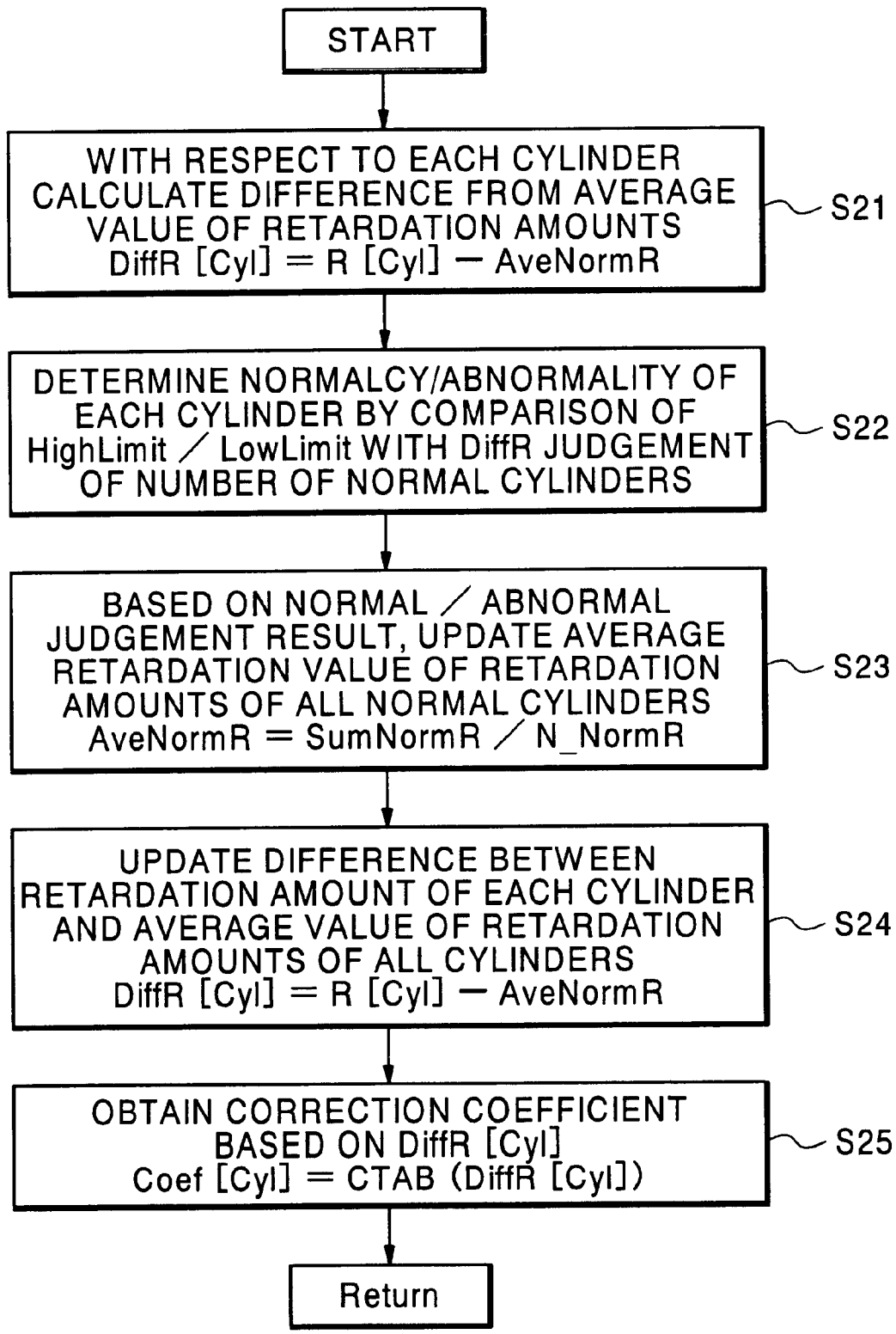
FIG. 6 is a flow chart illustrating a method of setting the correction coefficient in a knock control system for an internal combustion engine according to Embodiment 2 of the present invention.

FIG. 6 is a flow chart illustrating a method of setting the correction coefficient Coef [Cy1] according to Embodiment 2 of the present invention. The system block diagram and the knock judgement method in Embodiment 2 are identical to those of Embodiment 1, so explanations thereof are omitted.

First, at step S21, a difference between an average AveNormR of the ultimate retardation control amounts from the normal cylinders at the time of the previous calculation and an ultimate retardation control amount of each cylinder is calculated, and this difference is meant as DiffR.

At step S22, it is determined whether or not the DiffR of each cylinder obtained at step S21 is between a HighLimit and a LowLimit, and if it is outside the range, the cylinder in question is determined as abnormal. The HighLimit and the LowLimit each are used to determine the cylinder with the ultimate retardation control amount that is abnormally greater/less than the other cylinders, in order to prevent the cylinder with the abnormally great/small ultimate retardation control amount from contributing to the calculation of the average value and from abnormally raising/abnormally lowering the average value. Therefore, as a guideline, approximately −3° to 3° CA is considered to be an appropriate range.

At step S23, an average value AveNormR of the ultimate retardation control amounts is obtained from only the cylinders, which were determined as normal in step S22. That is, the average value of the retardation amount of the normal cylinders is updated based on the normal and abnormal judgement results. SumNormR is a sum of the ultimate retardation control amounts of the normal cylinders, and N_NormR is a number of cylinders determined as normal.

At step S24, the DiffR of each cylinder is updated based on the average value AveNormR produced from the ultimate retardation control amounts of the normal cylinders, which was updated at step S23.

At step S25, the correction coefficient Coef is obtained based on the DiffR calculated at step S24. The correction coefficient Coef obtained for each cylinder is used in the same way as in Embodiment 1.

Figure 3:
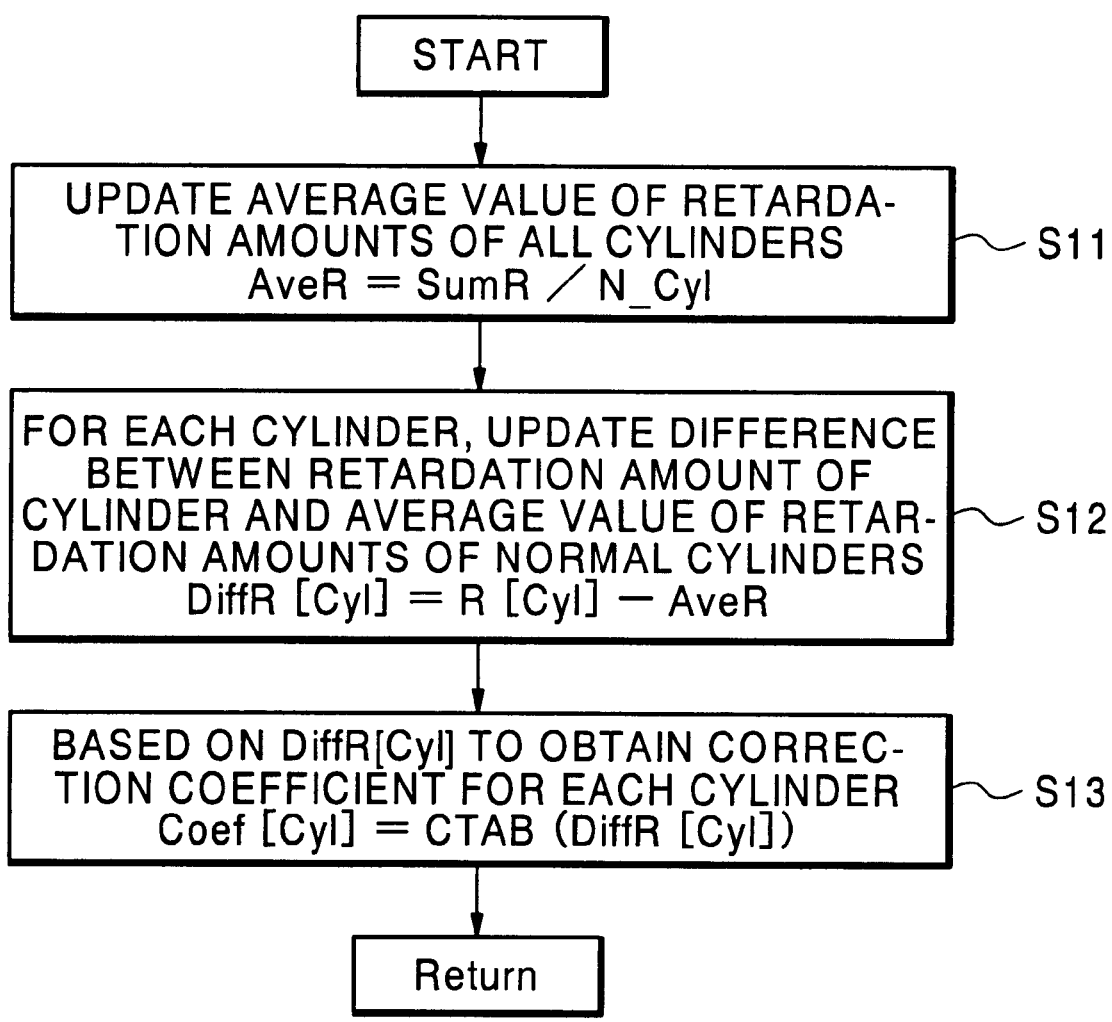
FIG. 3 is a flow chart showing a method of setting a correction coefficient in the knock control system for an internal combustion engine according to Embodiment 1 of the present invention.

Note that steps S21–S25 substantially constitute variation correction means for performing a correction to reduce the variation exhibited by a cylinder when at least one of the control parameter correction amounts, which are retardation amounts of the respective cylinders, varies greatly with respect to the others, similarly to steps S11–S13 as shown in FIG. 3 of Embodiment 1.

In this Embodiment 2, the cylinder with the abnormally great/small ultimate retardation control amount is excluded from the calculation of the average value. Therefore, even when a cylinder having an abnormally great/small ultimate retardation control amount is generated, an abnormal increase/abnormal decrease of the average value can be prevented from occurring.

As described above, according to the present invention, a knock control system for an internal combustion engine includes: knock detection means for evaluating an ionic current generated at a time of combustion of an air-fuel mixture in an internal combustion engine to output a knock detection signal; threshold value setting means for setting a threshold value for use in a knock judgement performed on the knock detection signal; knock judgement means for performing the knock judgement based on the threshold value and on the knock detection signal; control parameter correction request amount setting means for setting a control parameter correction request amount that includes at least ignition timing, based on the knock judgement result; control parameter correction means for setting the control parameter correction amount based on the control parameter correction request amount to correct the control parameter; and variation correction means for performing a correction to reduce variation exhibited by a cylinder in a case where at least one of the knock detection results and the control parameter correction amounts exhibits great variation with respect to those of other cylinders. As a result, it has such an effect that even when the cylinder having an abnormally greater/smaller knock detection result compared with the other cylinders is generated or the cylinder having an abnormally great/small control parameter correction amount is generated, correction is performed to reduce the variation, thereby being capable of making the abnormal level close to the levels of the other cylinders.

Also, according to the present invention, the variation correction means performs the correction to reduce variation with respect to a cylinder showing a great difference between at least one of reference levels of the knock judgement result and the control parameter correction amount, and the level exhibited by that particular cylinder. As a result, it has such an effect that the correction can be performed only for the cylinder in which the differences in levels among the cylinders becomes large.

Also, according to the present invention, the variation correction means sets the reference level based on at least one of the average value of knock judgement frequency of all the cylinders and the average value of the control parameter correction amounts of all the cylinders. As a result, it has such an effect that the reference level can be set by calculating the average values.

Also, according to the present invention, the variation correction means sets in advance an upper limit value and a lower limit value of the difference from the reference level of at least one of the knock judgement frequency and the control parameter correction amount of each cylinder, and updates the reference level based on at least one of the average value of the knock judgement frequencies and the average value of the control parameter correction amounts of all the cylinders except a cylinder where the difference between the reference level and the level exhibited by each cylinder is greater than the upper limit or less than the lower limit. As a result, it has such an effect that the cylinder having an abnormal knock judgement frequency and an abnormal control parameter correction amount can be excluded from the calculation of the average values, thereby being capable of preventing an abnormal decrease/abnormal increase of the average value from occurring, and of allowing the average to be an appropriate value.

Also, according to the present invention, the variation correction means has at least one of threshold value adjusting means for adjusting the threshold value used in the knock judgement, and control parameter correction request amount adjusting means for adjusting the control parameter correction request amount, wherein the threshold value adjusting means and the control parameter correction request amount adjusting means adjust the threshold value and the control parameter correction request amount based on the difference between the reference level and the level exhibited by each cylinder. As a result, it has such an effect that the threshold value is adjusted so that the knock judgement is easily/hardly performed, and the control parameter correction request amount is adjusted when the knocking is determined, the correction can be made to reduce the variation.

What is claimed is:

1. A knock control system for an internal combustion engine, comprising:

knock detection means for evaluating an ionic current generated at a time of combustion of an air-fuel mixture in an internal combustion engine to output a knock detection signal;

threshold value setting means for setting a threshold value for use in a knock judgement performed on the knock detection signal;

knock judgement means for performing the knock judgement based on the threshold value and on the knock detection signal;

control parameter correction request amount setting means for setting a control parameter correction request amount that includes at least ignition timing, based on the knock judgement result;

control parameter correction means for setting the control parameter correction amount based on the control parameter correction request amount to correct the control parameter; and variation correction means for performing a correction to reduce variation exhibited by a cylinder in a case where at least one of the knock detection results and the control parameter correction amounts exhibits great variation with respect to those of other cylinders.

2. The knock control system for an internal combustion engine according to claim 1, wherein the variation correction means performs the correction to reduce variation with respect to a cylinder showing a great difference between at least one of reference levels of the knock judgement result and the control parameter correction amount, and the level exhibited by that particular cylinder.

3. The knock control system for an internal combustion engine according to claim 2, wherein the variation correction means sets the reference level based on at least one of the average value of knock judgement frequency of all the cylinders and the average value of the control parameter correction amounts of all the cylinders.

4. The knock control system for an internal combustion engine according to claim 2, wherein the variation correction means sets in advance an upper limit value and a lower limit value of the difference from the reference level of at least one of the knock judgement frequency and the control parameter correction amount of each cylinder, and updates the reference level based on at least one of the average value of the knock judgement frequencies and the average value of the control parameter correction amounts of all the cylinders except a cylinder where the difference between the reference level and the level exhibited by each cylinder is greater than the upper limit or less than the lower limit.

5. The knock control system for an internal combustion engine according to claim 2, wherein the variation correction means has at least one of threshold value adjusting means for adjusting the threshold value used in the knock judgement, and control parameter correction request amount adjusting means for adjusting the control parameter correction request amount, wherein the threshold value adjusting means and the control parameter correction request amount adjusting means adjust the threshold value and the control parameter correction request amount based on the difference between the reference level and the level exhibited by each cylinder.

* * * * *